(12) United States Patent
Abdallah et al.

(10) Patent No.: US 10,996,649 B2
(45) Date of Patent: May 4, 2021

(54) SELF-CORRECTIVE NUT RUNNING FOR ROBOTIC APPLICATIONS

(71) Applicant: GM GLOBAL TECHNOLOGY OPERATIONS LLC, Detroit, MI (US)

(72) Inventors: Muhammad E. Abdallah, Rochester Hills, MI (US); Gary L. Villeneuve, Clarkston, MI (US); Sreten Zakula, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 341 days.

(21) Appl. No.: 16/131,478

(22) Filed: Sep. 14, 2018

(65) Prior Publication Data

US 2019/0011897 A1 Jan. 10, 2019

Related U.S. Application Data

(62) Division of application No. 15/062,297, filed on Mar. 7, 2016, now Pat. No. 10,120,364.

(51) Int. Cl.
*G05B 19/402* (2006.01)

(52) U.S. Cl.
CPC .. *G05B 19/402* (2013.01); *G05B 2219/49113* (2013.01)

(58) Field of Classification Search
CPC ............... B23P 19/069; B23P 2700/50; G05B 2219/45091; G05B 19/402
See application file for complete search history.

(56) References Cited

U.S. PATENT DOCUMENTS

| | | | | |
|---|---|---|---|---|
| 4,841,632 A | * | 6/1989 | Namiki | ................. B23P 19/069 29/273 |
| 4,894,908 A | | 1/1990 | Haba, Jr. | |
| 5,036,576 A | * | 8/1991 | Gast | ......................... B21J 15/32 29/407.01 |
| 5,229,931 A | * | 7/1993 | Takeshima | ......... G05B 19/0421 700/169 |
| 6,332,861 B1 | * | 12/2001 | Otsuka | ............... B23Q 3/15706 483/13 |

(Continued)

FOREIGN PATENT DOCUMENTS

| | | |
|---|---|---|
| JP | H068074 A | 1/1994 |
| JP | 2002331428 A | 11/2002 |
| JP | 2012096296 A | 5/2012 |

OTHER PUBLICATIONS

SIPO, Chinese Office Action issued in Chinese Application No. 201610171654.X, dated Sep. 20, 2017.

*Primary Examiner* — Ryan Rink
(74) *Attorney, Agent, or Firm* — Lorenz & Kopf, LLP

(57) ABSTRACT

A method for position correction of a machine relative to a work piece. The machine may be provided with an end effector. The work piece may be engaged with the end effector. A force or a moment resulting from engaging the work piece with the end effector may be measured. A pose error may be determined from the force and/or the moment, wherein the pose error may define a misalignment of the end effector. The end effector may be repositioned an amount equal to the pose error to correct the misalignment. One application may involve torqueing nuts with a nut runner, which may be accomplished through the use of an automated machine such as a robot.

20 Claims, 3 Drawing Sheets

(56) References Cited

U.S. PATENT DOCUMENTS

| | | | | |
|---|---|---|---|---|
| 7,013,760 | B1* | 3/2006 | Kennison | B25B 23/0078 |
| | | | | 81/57.36 |
| 9,387,561 | B2* | 7/2016 | Yoshinaga | B23P 19/06 |
| 2002/0178692 | A1* | 12/2002 | Panzarella | B65B 57/02 |
| | | | | 53/399 |
| 2006/0271240 | A1* | 11/2006 | Nihei | G05B 19/4083 |
| | | | | 700/245 |
| 2006/0288577 | A1* | 12/2006 | Bormuth | B23P 19/10 |
| | | | | 29/894 |
| 2007/0289151 | A1* | 12/2007 | Doan | G01B 5/255 |
| | | | | 33/203 |
| 2009/0193642 | A1* | 8/2009 | Lin | B25J 15/0061 |
| | | | | 29/428 |
| 2013/0212883 | A1* | 8/2013 | Soto Martinez | B21J 15/32 |
| | | | | 29/897.2 |
| 2014/0135987 | A1* | 5/2014 | Maischberger | B25J 9/1633 |
| | | | | 700/258 |
| 2015/0059175 | A1* | 3/2015 | Abdallah | B25J 15/0019 |
| | | | | 29/888.01 |
| 2015/0234375 | A1* | 8/2015 | Takayama | G05B 19/4086 |
| | | | | 700/187 |
| 2015/0306716 | A1* | 10/2015 | Neumeier | B25J 13/087 |
| | | | | 29/464 |
| 2016/0031051 | A1* | 2/2016 | Izumiya | B25J 11/00 |
| | | | | 81/57.37 |
| 2016/0082557 | A1* | 3/2016 | Friz | B23P 19/06 |
| | | | | 29/525.02 |
| 2016/0279798 | A1* | 9/2016 | Abdallah | G05B 19/402 |
| 2016/0354872 | A1* | 12/2016 | Koscielski | B65G 47/244 |
| 2017/0190052 | A1* | 7/2017 | Jaekel | B25J 9/1664 |
| 2019/0270200 | A1* | 9/2019 | Sakai | B25J 9/1697 |

* cited by examiner

SELF-CORRECTIVE NUT RUNNING FOR ROBOTIC APPLICATIONS

CROSS REFERENCE TO RELATED APPLICATIONS

This application is a divisional of, and claims the benefit of, co-pending U.S. application Ser. No. 15/062,297 filed Mar. 7, 2016, which claims the benefit of U.S. Provisional Application No. 62/139,022 filed Mar. 27, 2015.

INTRODUCTION

The field to which the disclosure generally relates includes fastening, and in particular includes automated alignment correction in fastening.

Manufactured products are typically assembled from a number of components that are integrated into a product. The individual elements may be engaged in a number of fashions, one of which involves being fastened together. Fasteners may take a number of forms but in general require a tool to apply a fastening force and/or torque to provide a secure connection. One application may involve torqueing nuts with a nut runner, which may be accomplished manually or through the use of automated machines such as robots.

SUMMARY

A number of illustrative variations may involve a method for position correction of a machine relative to a work piece. The machine may be provided with an end effector. The work piece may be engaged with the end effector. A force or a moment resulting from engaging the work piece with the end effector may be measured. A pose error may be determined from at least one of the force or the moment, wherein the pose error may define a misalignment of the end effector. The end effector may be repositioned in a direction of the pose error to correct the misalignment.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION

The following description of the variations is merely illustrative in nature and is in no way intended to limit the scope of the invention, its application, or uses.

In assembly, one of the challenges in efficient fastening of components involves engaging and manipulating individual elements that are intended to be secured together. When elements are misaligned with a tool that is intended to provide the manipulation, successful fastening may be delayed, or components may be discarded as scrap. One such application may involve end effectors that may be preloaded with a first component and that first must correctly engage a second component to then effect fastening. To address associated misalignment, a system and method may be provided, according to a number of variations described herein that may equip an automated fastening application with force sensing to intelligently correct misalignments. The ability to correct a misalignment, may be provided within the productive cycle time of the application. In addition, an ability to learn error trends and adjust the tool path may be provided, while the process remains in productive operation. Increased production efficiency may result.

Figure 1:
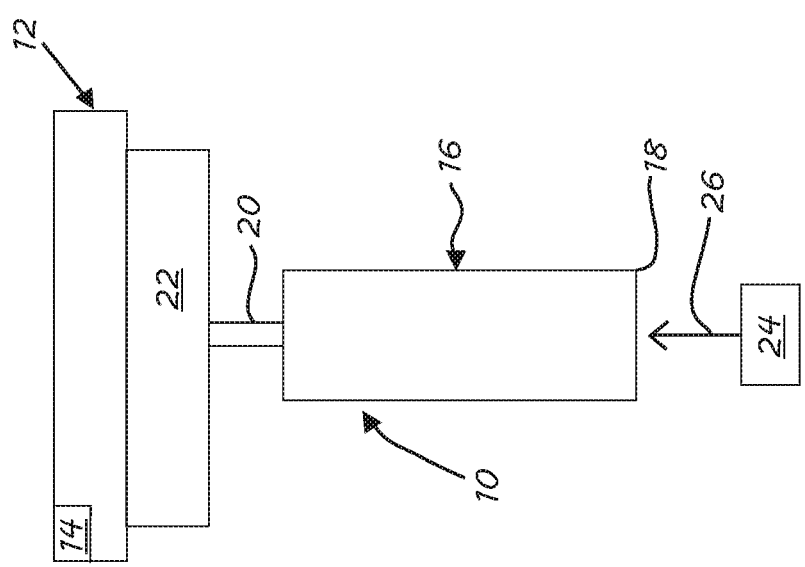
FIG. 1 is a schematic illustration of a fastening apparatus according to a number of variations.

More specifically, a number of illustrative variations may be described in relation to a nut driving system 10 as illustrated in FIG. 1, which may automatically correct for misalignment. The nut driving system 10 may include an automated machine 12, which may be an electro-mechanical machine, an electro-hydraulic machine, an electro-pneumatic machine, and may be robotic or of another type of construction to effect programmed movement. The machine 12 may be guided by programmable logic. The machine 12 may include a controller 14 that may involve one or more of electronic circuits, and processors, including associated memory and storage, executing one or more software or firmware programs, logic circuits, and other devices, along with other suitable components to provide the desired functionality. The controller 14 or other appropriate control device may operate according to a number of control algorithms, instructions and programs stored in memory and executed to provide various functions. Memory may be volatile or non-volatile and may be read-only, programmable, random access, hard drive, or other types.

The machine 12 may include an end effector 16, which for purposes of description, may be a fastener tightening tool such as a nut runner with a repositionable and rotatable socket 18. The socket 18 may be any type of fastener engaging receptacle and may be connected into the machine 12 through a nut runner assembly 20. At a convenient location between the socket 18 and the machine 12, such as at the inboard end of the nut runner assembly 20, sensors 22 may be positioned to sense loads on the end effector 16. The sensors 22 may provide one or more functions and in particular, may sense force and force related inputs. The sensors 22 may also measure the torque established by the end effector 16. For example, the sensors 22 may include a six-axis load cell. This type of sensor may simultaneously measure forces in 3 mutually perpendicular axes along with 3 simultaneous torques about the axes.

Figure 4:
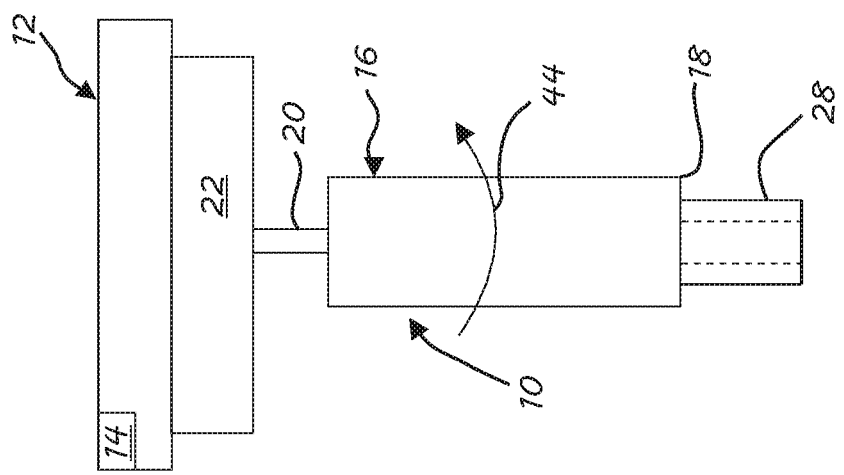
FIG. 4 is a schematic illustration of a fastening apparatus according to a number of variations, shown in an aligned condition.

The machine 12 may include any number of individual sockets 18. To begin a fastening operation, the end effector 16 may be loaded with a fastener such as a nut 24 that may be received by the socket 18 as indicated by the arrow 26. The machine 12 may be repositioned to pick up the nut 24 or the nut 24 may be delivered to the socket 18. As an alternative to picking up the nut 24, it may be pre-threaded in the opening or on the stud to which it will be torqued. In a number of variations the nut 24 may be a tube nut, such as shown in FIG. 4 with an axial opening, which may be threaded into or onto a mating part to connect a tube. The socket may be configured to engage the tube nut and may be a crows-foot type socket.

Figure 2:
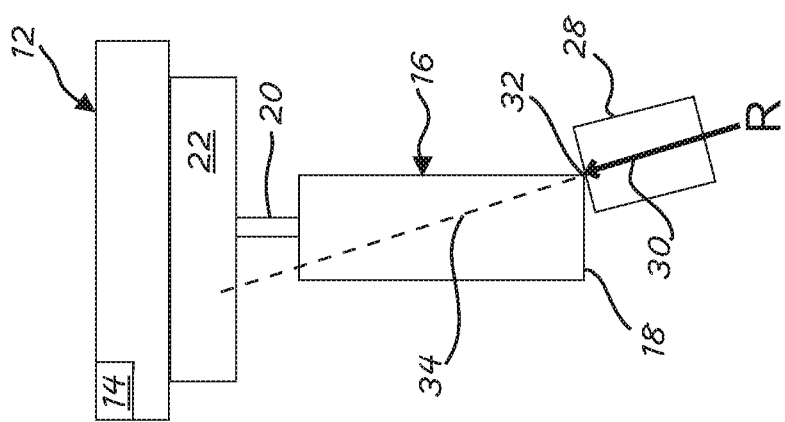
FIG. 2 is a schematic illustration of a fastening apparatus according to a number of variations, shown in a misaligned condition.

Referring to FIG. 2, the machine 12 may reposition the end effector 16 toward a mating component which may be a threaded stud 28. Where the nut 24 is a tube nut, the stud 28 may include an axial opening to open to the interior of the tube. When the socket 18 successfully aligns with the stud 28, the machine 12 may rotate the socket 18 to torque the nut 24. The end torque may be measured via the sensors 22 and may be compared to tolerance standards. The end effector 16 may then be retracted and the process may continue to other work pieces.

Figure 3:
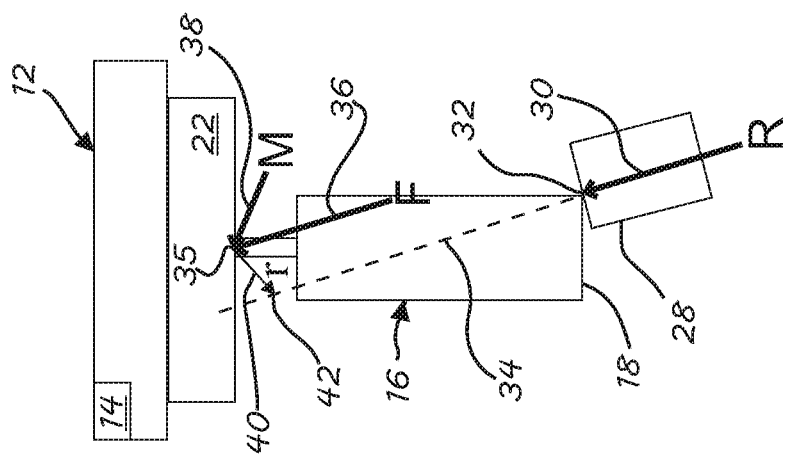
FIG. 3 is a schematic illustration of a fastening apparatus with forces indicated according to a number of variations.

In the case of a misalignment such as shown in FIG. 2, the stud 28 may impart a reaction force 30 to the end effector 16, applied at a contact interface 32. As illustrated in FIG. 3, the reaction force 30 may act along a line of action 34 and may be represented by "R." The reaction force 30 may be sensed at a point 35 by the sensors 22 which may discern a resultant force 36 (which may be represented by "F") and a moment vector 38 (which may be represented by "M"). In essence, the force 30 acting at the contact interface 32 is represented by the wrench of the resultant force 36 and moment vector 38. From the wrench at point 35, a position vector 40 (which may be represented by "r"), to the line of action 34 may be derived, which may be determined in the controller 14. The position vector 40 may further be described as the vector from the point 35 to a point 42 on the line of action 34. The position vector "r" may be found by dividing the cross product of vectors F and M by the dot product of F and F. This may be stated as the equation $r = F \times M / F \cdot F$.

The desired pose of the end effector 16 may be used to refer to the position and the orientation of the end effector 16. When misaligned with the stud 28, the end effector 16 may be said to have a pose error. From the position vector 40 the location of the line of action 34 is known. The direction of the line of action 34 is also known from the sensors 22. This is because the direction of R is the equal to the direction of F. With the direction of R, the location of the line of action 34, the geometry of the end effector 16, and the location of the point 35 all known, the pose error may be determined. Knowing the pose error, enables repositioning of the end effector 16 to a target position which may be aligned with the stud 28. The machine 12 may reposition the end effector 16 to the target position to negate the pose error, which may be illustrated in FIG. 4. Referring thereto, the socket 18 may be aligned with the stud 28 and the end effector 16 may be rotated to apply the desired torque to the nut 24 (located within the socket 18). If after the initial repositioning of the end effector 16, the socket 18 is still misaligned with the stud 28, the process as described in relation to FIGS. 1 through 3 may be repeated. Alternatively, the corrective repositioning may be applied incrementally to converge iteratively to the correct position. The stud 28 may be any other threaded feature for engaging a fastener and may have an axial opening for tube connection.

Figure 5:
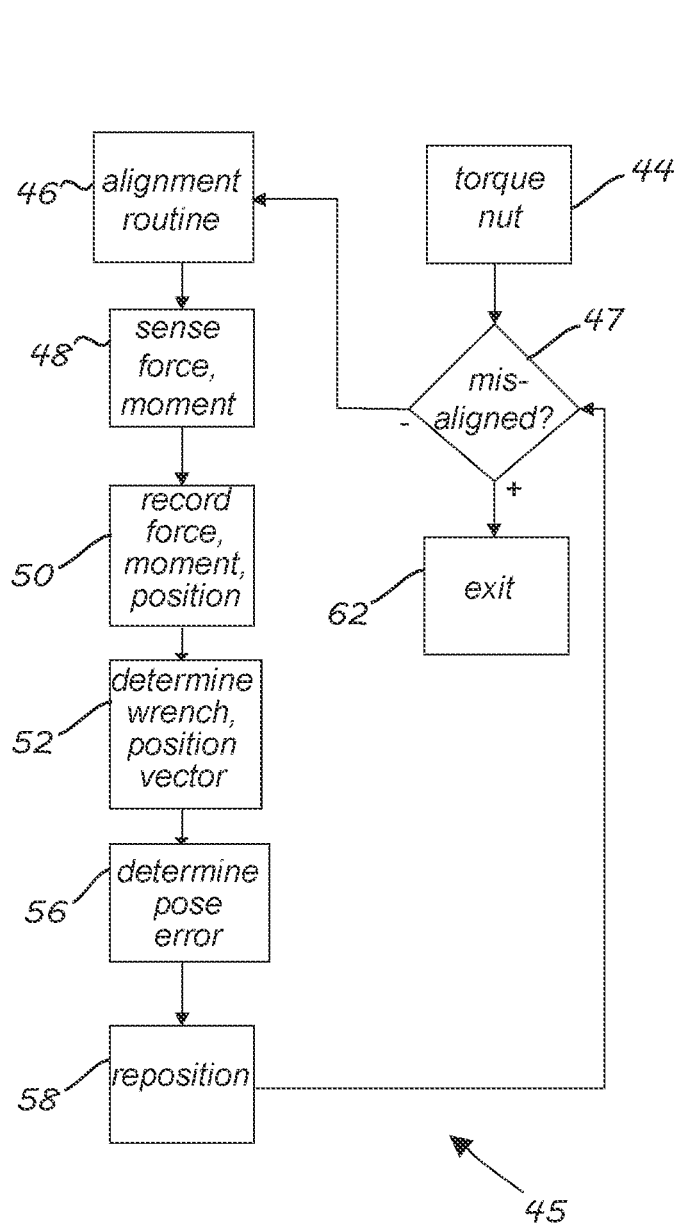
FIG. 5 is a diagrammatic illustration in flow chart form of a self-correcting process according to a number of variations.

The self-correcting process 45 carried out by the machine 12 may be further described in relation to the flow chart illustrated in FIG. 5. The process 45 may start at step 44 where the nut 24 may be torqued on the stud 28. Proceeding to step 47, the correct application of the nut 24 is determined. Misalignment may be discerned from an unexpected force or torque measured by the sensors 22 as compared to stored data for aligned conditions, or through another means. If the nut 24 is aligned, the process 45 is exited at step 62 and the machine 12 may move on to drive another nut. If the nut 24 is not aligned, the process 45 may proceed to step 46 to start an alignment routine. From the alignment routine start step 46, the process 45 may proceed to step 48 where the resultant force and moment may be sensed by the sensors 22. The process 45 may then proceed to step 50 where the force, moment and position of the end effector 16 may be recorded, such as in the controller 14. At step 52 the wrench and position vector 40 may be determined from the sensed force and moment as described above, representative of the force acting at the contact interface 32. Using the position vector 40, the pose error of the end effector 18 may be determined at step 56, as further described above. In addition, the sensed force, moment and displacement from the position recorded at step 50 may be recorded. The sensed force, moment and displacement may be stored so that learning may be used to adjust positioning of the end effector automatically and without a stoppage of productive operation. The learned data may be used to apply a best fit rigid body displacement to adjust the start position of the machine 12

Using the determined pose error, the machine 12 may reposition the end effector 18 at step 58, and the process 45 may return to step 47 where the correct application of the nut 24 may again be determined. At step 47, if the nut 24 is aligned, the process 45 is exited at step 62 and the machine 12 may move on to drive another nut. If the nut 24 is not aligned, the process 45 may proceed again to step 46 to start an alignment routine. Alternatively, the end-effector may be repositioned incrementally at step 58, less than the full pose-error, to iteratively converge to the correct pose.

Figure 7:
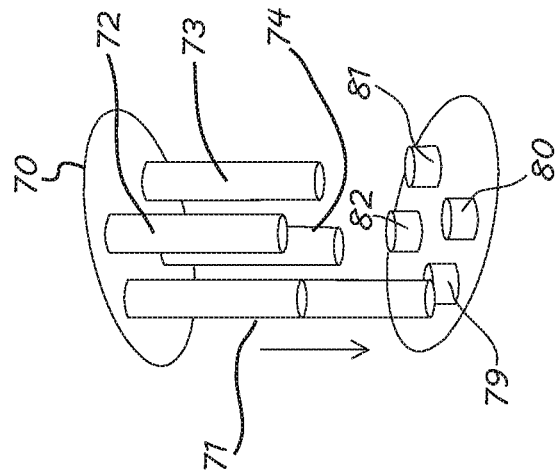
FIG. 7 is a schematic illustration of a fastening apparatus according to a number of variations.

A number of additional variations may be described with reference to FIG. 6 which illustrates a fastening machine 70 with multiple spindles 71, 72, 73 and 74. The machine 70 may extend the spindles 71-74 in unison toward and away from a work piece 76 as indicated at reference numeral 78. The spindles 71-74 may be used to effect an action to connect a fastener with a threaded feature such as tightening nuts on studs 79, 80, 81 and 82. In the event a misalignment is detected during a tightening operation between any number of the spindles 71-74 and the studs 79-82, the machine 70 may automatically correct alignment. After the machine 70 has engaged the work piece 76 for a fastening event and has retracted the spindles 71-74 from the studs 79-82, to correct any indicated misalignments the individual spindles may be reengaged with the work piece 76. As shown in FIG. 7 for example, if a misalignment is detected for the spindle 71, the machine 70 may individually extend the spindle 71 to engage the stud 79. The machine 70 may correct alignment according to the process described in relation to FIGS. 1 through 5. Once the spindle 71 is aligned, the machine 70 may continue to align any other spindles for which misalignment was detected.

Figure 6:
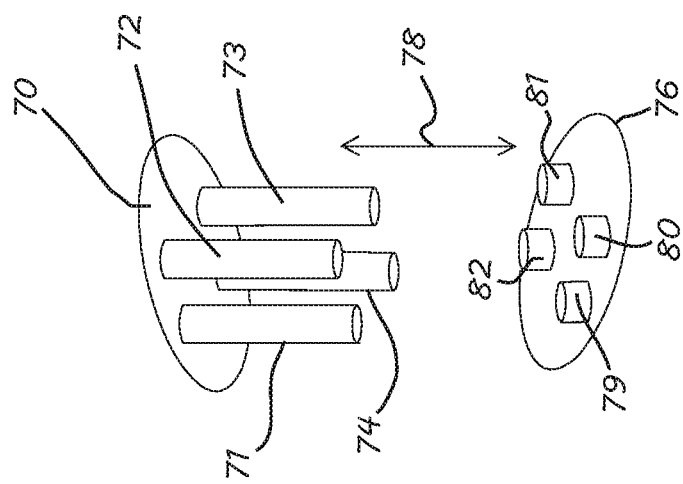
FIG. 6 is a schematic illustration of a fastening apparatus according to a number of variations.
Figure 8:
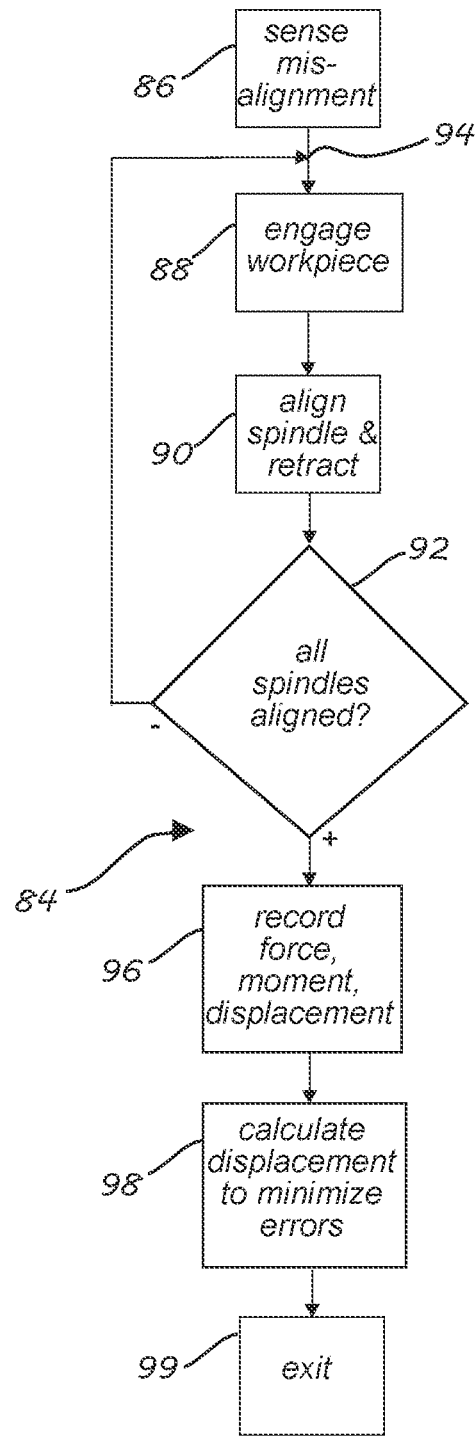
FIG. 8 is a diagrammatic illustration in flow chart form of a self-correcting process according to a number of variations.

A number of variations for a multiple spindle machine such as illustrated in FIGS. 6 and 7 may be described in relation to FIG. 8 where a self-correcting process 84 is illustrated. The process 84 may be initiated at step 86 which may result from a sensed misalignment of one or more spindles. At step 88 for an individual misaligned spindle, the spindle may be extended to engage the work piece 76. At step 90 the misaligned spindle may be aligned according to the self-correcting process 45 as described in reference to FIG. 5. Proceeding to step 92, after alignment and retraction of the individual spindle, the process 84 may return to point 94 if additional individual spindles are in need of alignment. Once all misaligned spindles are aligned the process 84 may proceed to step 96 where the recorded force, moment and displacement for each misaligned spindle from step 60 of FIG. 5 may be read. The learned data may be used to apply a best fit rigid body displacement to adjust the machine 70. At step 98 the displacement of the set of spindles 71-74 that minimizes the error across all the spindles may be calculated. The error history at the multiple sockets may be averaged to calculate the best new position that results the minimum net error. The process 84 may proceed to step 99 where the self-correction process may be exited and the fastening operation of the machine 70 may continue using the displacement adjustment calculated at step 98.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a method for position correction of a machine relative to a work piece. The machine may be provided with an end effector. The work piece may be engaged with the end effector. A force and a moment resulting from engaging the work piece with the end effector may be measured. A pose error may be determined from the force and/or the moment, wherein the pose error may define a misalignment of the end effector and a direction thereof. The end effector may be repositioned in a direction of the pose error to correct the misalignment. Alternatively, the end-effector may be repositioned incrementally, less than the full pose-error, to iteratively converge to the correct pose.

Variation 2 may include the method according to variation 1 wherein the end effector may contact the work piece. The misalignment of the end effector may be calculated from the force or moment, after the end effector contacts the workpiece.

Variation 3 may include the method according to variation 1 or 2 and may include determining whether the end effector is aligned, after repositioning the end effector.

Variation 4 may include the method according to any of variations 1 through 3 wherein the pose error may be recorded and may be used to teach the machine to better align with the work piece.

Variation 5 may include the method according to any of variations 1 through 4 wherein the end effector may include multiple spindles. The step of engaging the work piece with the end effector may include engaging the work piece with a first one of the multiple spindles.

Variation 6 may include the method according to variation 5 and may include engaging the work piece with a second one of the multiple spindles. The steps of measuring a force and/or a moment resulting from engaging the work piece with the end effector; determining a pose error from the force and moment, wherein the pose error may define a misalignment of the end effector and a direction thereof; and repositioning the end effector in the direction of the pose error to correct the misalignment, may be repeated for the second one of the multiple spindles.

Variation 7 may involve a method for position correction of an end effector relative to a work piece. The work piece may be engaged with the end effector at a contact interface, wherein an application force arises at the contact interface along a line of action. A resultant force and moment may be measured at a sensor point that is spaced apart from the contact interface. An error in at least one of the position or orientation of the work piece, may be calculated based on the resultant force and moment. The end effector may be repositioned to correct any misalignment of the end effector with the work piece.

Variation 8 may include the method according to variation 7 wherein the end effector may be provided with a socket for driving a tube nut.

Variation 9 may include the method according to variation 7 or 8 and may include the step of determining whether the end effector is aligned after the end effector has been repositioned.

Variation 10 may include the method according to variation 9 and may include repeating the steps: engaging the work piece with the end effector at a contact interface, wherein an application force arises at the contact interface along a line of action; measuring a resultant force and moment at a sensor point that is spaced apart from the contact interface; calculating an error in at least one of the position or orientation of the work piece, based on the resultant force and moment; and repositioning the end effector to correct any misalignment of the end effector with the work piece, after determining whether the end effector is aligned results in a negative determination.

Variation 11 may include the method according to any of variations 7 through 10 wherein the end effector may include multiple spindles. The step of engaging the work piece with the end effector may include engaging the work piece with a first one of the multiple spindles.

Variation 12 may include the method according to variation 11 wherein the work piece may be engaged with a second one of the multiple spindles. The steps: measuring a resultant force and moment at a sensor point that is spaced apart from the contact interface; calculating an error in at least one of the position or orientation of the work piece, based on the resultant force and moment; and repositioning the end effector to correct any misalignment of the end effector with the work piece, after determining whether the end effector is aligned results in a negative determination, may be repeated for the second one of the multiple spindles.

Variation 13 may include the method according to variation 12 wherein repositioning the end effector corrects a pose error in an iterative process. The pose error may be recorded for each of the spindles. A new starting position for the end effector may be calculated that results in a minimum net position error of the multiple spindles.

Variation 14 may involve a method for position correction of an end effector relative to a work piece. The end effector may be provided with a fastener tightening tool. The work piece may be provided with a threaded feature. The end effector may be moved to engage the work piece. The fastener tightening tool may be rotated to thread the fastener with the threaded feature. A resulting torque on the fastener may be measured. When the resulting torque is below a threshold, the threaded feature may be contacted with one of the fastener tightening tool and the fastener. A resulting force and moment may be measured. The end effector may be repositioned an amount based on the resultant force and moment.

Variation 15 may include the method according to variation 14 wherein the resultant force and moment along with their magnitude are recorded to improve the step of moving the fastener tightening tool to engage the fastener with the threaded feature.

Variation 16 may include the method according to variation 14 or 15 wherein one of the fastener tightening tool or the fastener may contact the threaded feature at a contact interface. A misalignment of the end effector may be calculated using the resultant force and moment, after the fastener tightening tool contacts the threaded fastener Variation 17 may include the method according to any of variations 14 through 16 and may include determining whether the end effector is aligned with the threaded feature after repositioning the end effector.

Variation 18 may include the method according to any of variations 14 through 17 wherein the end effector may include multiple fastener tightening tools loaded with multiple fasteners. The work piece may include multiple threaded features. The step of moving the end effector to engage the fastener with the threaded feature may include moving the multiple fastener tightening tools to engage the multiple fasteners with the multiple threaded features.

Variation 19 may involve a robotic system that may include a programmable machine that may have an end effector with a nut runner. A force sensor on the programmable machine may be positioned to measure a reaction force on the nut runner. A controller may communicate with the force sensor and the programmable machine. The controller may be responsive to the reaction force and the nut runner may be moved by the programmable machine in response to the reaction force.

Variation 20 may include the robotic system according to variation 19 wherein the controller may command an adjusted position for the machine in response to an error in the fastening operation.

Variation 21 may include the robotic system of variation 20 wherein the adjusted position may depend on the sensed reaction force.

The above description of select variations within the scope of the invention is merely illustrative in nature and, thus, variations or variants thereof are not to be regarded as a departure from the spirit and scope of the invention.

What is claimed is:

1. A method for position correction of a nut runner relative to a work piece that includes a threaded stud and a nut, the method comprising:
    pre-threading the nut with the threaded stud;
    engaging, with the nut pre-threaded with the threaded stud, the work piece with the nut runner at a contact interface, wherein a reaction force arises at the contact interface along a line of action;
    measuring a resultant force and moment at a sensor point that is spaced apart from the contact interface;
    calculating an error in at least one of the position or orientation of the work piece, based on the resultant force and moment;
    disengaging the nut runner from the workpiece;
    repositioning the nut runner to correct any misalignment of the nut runner with the work piece;
    reengaging the nut runner with the workpiece; and
    torqueing, when the nut runner is aligned with the workpiece, the nut with the threaded stud.

2. The method according to claim 1, further comprising:
    measuring, when repositioning the nut runner, a displacement of the nut runner; and
    recording, by a controller, the resultant force and the displacement for use in later repositioning the nut runner.

3. The method according to claim 1, further comprising the step of determining a second time and iteratively, after repositioning the nut runner, whether the nut runner is aligned.

4. The method according to claim 3, further comprising repeating, after repositioning the nut runner, the steps:
    engaging the work piece with the nut runner at the contact interface;
    measuring the resultant force and moment at the sensor point;
    calculating the error; and
    repositioning the nut runner to correct any new misalignment of the nut runner with the work piece.

5. The method according to claim 1, wherein the nut runner includes multiple spindles, and wherein the step of engaging the work piece with the nut runner comprises engaging the work piece with a first one of the multiple spindles.

6. The method according to claim 5, further comprising:
    engaging the work piece with a second one of the multiple spindles and, for the second one of the multiple spindles, repeating the steps:
    measuring the resultant force and moment at the sensor point;
    calculating the error; and
    repositioning the nut runner to correct any misalignment of the second one of the multiple spindles with the work piece.

7. The method according to claim 6, wherein repositioning the nut runner corrects a pose error in an iterative process, and further comprising:
    recording, by a controller, the pose error for each of the multiple spindles; and
    calculating, by the controller, a new starting position for the nut runner that results in a minimum net position error of the multiple spindles.

8. A method for position correction of an end effector relative to a work piece comprising:
    engaging the work piece with the end effector at a contact interface, wherein a reaction force arises at the contact interface along a line of action;
    measuring a resulting torque between the workpiece and the nut runner;
    measuring a resultant force and moment at a sensor point that is spaced apart from the contact interface;
    determining, using the resultant force and moment, a position vector directed from the sensor point to the line of action;
    calculating, using the position vector, whether an error exists in at least one of the position or orientation of the work piece relative to the end effector, based on the resultant force and moment;
    determining, by a controller and after measuring the resultant force, whether the resulting torque indicates a misalignment between the nut runner and the workpiece; and
    repositioning, when at least one of the error and the misalignment exists, the end effector to correct the position of the end effector with the work piece.

9. The method according to claim 8, further comprising:
    defining the sensor point at a location of a sensor, and positioning the sensor so that the end effector is positioned between the sensor and the work piece.

10. The method according to claim 8, further comprising:
measuring, when repositioning the end effector, a displacement of the end effector; and
recording, by the controller, the resultant force and the displacement for use in later repositioning the end effector.

11. The method according to claim 8, further comprising, prior to engaging the workpiece with the end effector:
loading a nut in the end effector so that the end effector includes the nut; and
repositioning the end effector toward the work piece.

12. The method according to claim 11, further comprising aligning the end effector with the work piece according to a preprogrammed orientation, prior to engaging the work piece with the end effector.

13. The method according to claim 12, further comprising measuring the repositioning of the end effector and adjusting, using the measured repositioning, the preprogrammed orientation.

14. The method according to claim 8, further comprising, prior to measuring the resultant force:
loading a nut in the end effector so that the end effector includes the nut; and
repositioning the end effector toward the work piece; and
attempting to torque the nut on the workpiece.

15. The method according to claim 8, wherein repositioning the end effector comprises converging, iteratively, on a position of the end effector that negates the error.

16. A method for position correction of a nut runner relative to a work piece comprising:
loading a nut in the nut runner so that the nut runner includes the nut;
operating, by a controller, the nut runner in a fastening operation intended to connect the nut with the work piece;
controlling, by the controller, the nut runner to engage the work piece at a contact interface;
determining, by the controller with input from a force sensor, a reaction force between the nut runner and the work piece;
measuring a resulting torque between the workpiece and the nut runner;
evaluating, by the controller and after measuring the resulting torque, the reaction force that arises at the contact interface along a line of action between the nut runner and the workpiece;
determining, by the controller, whether the resulting torque indicates a misalignment between the nut runner and the workpiece;
determining, by the controller and using the reaction force, whether the nut runner is misaligned with the work piece; and
repositioning the nut runner to correct any misalignment of the nut runner with the work piece.

17. The method according to claim 16, further comprising:
disengaging, after engaging the nut runner with the workpiece, the nut runner from the workpiece;
reengaging, after repositioning the nut runner, the nut runner with the workpiece; and
torqueing, when the nut runner is aligned with the workpiece, the nut with the threaded stud.

18. The method according to claim 16, wherein the nut runner includes multiple spindles, and wherein the step of controlling the nut runner to engage the work piece comprises controlling the nut runner to engage the work piece with a first one of the multiple spindles.

19. The method according to claim 18, further comprising:
controlling the nut runner to engage the work piece with a second one of the multiple spindles and, for the second one of the multiple spindles, repeating the steps:
evaluating, by the controller, a reaction force that arises at the contact interface along a line of action between the nut runner and the workpiece;
determining, by the controller with input from a force sensor, a reaction force between the nut runner and the work piece;
determining, by the controller and using the reaction force, whether the nut runner is misaligned with the work piece; and
repositioning the nut runner to correct any misalignment of the nut runner with the work piece.

20. The method according to claim 19, wherein repositioning the nut runner corrects a pose error in an iterative process, and further comprising:
recording, by a controller, the pose error for each of the multiple spindles; and
calculating, by the controller, a new starting position for the nut runner with multiple spindles that results in a minimum net position error of the multiple spindles.

* * * * *